United States Patent [19]

Chalet

[11] Patent Number: 4,638,474
[45] Date of Patent: Jan. 20, 1987

[54] COMMUNICATION SYSTEM

[75] Inventor: Alain R. G. Chalet, Overijse, Belgium

[73] Assignee: ITT Corporation, New York, N.Y.

[21] Appl. No.: 682,038

[22] Filed: Dec. 14, 1984

[51] Int. Cl.$^4$ .......................... H04Q 11/04; H04J 3/24
[52] U.S. Cl. ......................................... 370/60; 370/94
[58] Field of Search .............................. 370/58, 60, 94

[56] References Cited

U.S. PATENT DOCUMENTS 4,238,851 12/1980 Takahashi et al. ..................... 370/94
4,539,676  9/1985 Lucas .................................... 370/94

OTHER PUBLICATIONS

Ross et al, "A Distributed Processing Architecture for Voice/Data Switching", NAECON 1981, May 19-21, 1981, pp. 350-356.

Primary Examiner—Douglas W. Olms
Assistant Examiner—Wellington Chin
Attorney, Agent, or Firm—Peter C. Van Der Sluys; Robert A. Hays

[57] ABSTRACT

A communication system includes a digital switching network, a first apparatus for establishing communication paths interconnected thereto via a terminal element and a second apparatus for establishing communication paths interconnected directly thereto. The second apparatus being dedicated to communicating with the network via packetized messages.

6 Claims, 3 Drawing Figures

COMMUNICATION SYSTEM

CROSS-REFERENCE TO RELATED APPLICATIONS

This application is related to the following U.S. patent applications: Ser. No. 682,030; Ser. No. 682,033; Ser. No. 682,034; Ser. No. 682,035; Ser. No. 682,228 all filed on even date herewith; and Ser. No. 722,894 filed on Apr. 12, 1985. All of the above applications are assigned to the assignee hereof.

BACKGROUND OF THE INVENTION

The present invention ggnerally relates to a communication system and, in particular, relates to such a system having, for each grouping of subscribers, a first apparatus for establishing communication paths interconnecting with a switching network and a second apparatus for establishing communication paths interconnecting with the switching network via a terminal control element associated with the switching network and prededicated to a group of subscribers.

The advent of data communication devices such as computer terminals, high speed printers and numerous other presently known data communication devices has resulted in somewhat of a dilemma for the telecommunication industry.

As well known, most present telecommunication networks are based on conventional analog circuit switched centrally controlled exchanges. One difficulty manifested by such centralized exchanges is that the entire network associated therewith experiences catastrophic failure when a malfunction or failure occurs in the centralized exchange. The occurance of such a failure, regardless of the magnitude thereof, consequently adversly impacts a substantial portion, if not all, of the subscribers thereto. In addition, by being restricted to an analog circuit switched centralized exchange, any data transmission between any two subscribers thereto must traverse the centralized exchange. Further, such data tranmissions are difficult to interfere with and usually require modems to adapt the conventional telephone equipment with the signals required to operate data transmitting/receiving devices. Such modems are becoming more complex and difficult since the variety of data devices, as well as the data rates thereof, is increasing. At the present time, the ideal solution would be to simply install entirely new switching systems, or exchanges that are capable of handling the variety of data types and rates. However, in many instances, such an installation would be quite wasteful since many present exchanges are still not near the end of their useful life.

One alternative to a centralized exchange is a switch network that has distributed control, such as, for example, the ITT System 12 Digital Exchange. In that particular architecture, a plurality of terminal interfaces interconnect with a digital switching network, the digital switching network is provided to establish communication paths between different terminal interfaces. Each terminal interface autonomously sets up communication paths between and among all subscribers connected thereto as well as paths through the digital switching network when a subscriber interconnected to another terminal interface is called. One significant advantage of an exchange having distributed control is that the catastrophic failure of the entire exchange is avoided in the event of the failure of any single component thereof. That is, if one or more terminal interfaces fail those remaining active can still utilize the digital switching network, or in the event that the entire digital switching network fails the terminal interfaces nevertheless provide complete local service to the subscribers thereto.

Since present exchanges are generally adapted to accept only a limited number of different types of devices, it is clear that by providing an exchange having distributed control the expansion thereof, to accommodate all present and future data services, can be modular in nature without requiring the expensive redesign of an entire exchange.

Consequently, it is quite apparent that with the growth and variation of data devices, and the anticipated continued growth of same, some communication system that interfaces with present communication systems and provides substantial data communication services without requiring the elimination of presently existing exchanges is in demand.

SUMMARY OF THE INVENTION

Accordingly, it is one object of the present invention to provide a communication system for establishing communication paths directly to a switching network for packetized data in addition to the existing communication paths.

This object is accomplished, at least in part, by providing a first apparatus for establishing communication paths directly to a switching network and a second apparatus for establishing communication paths to a terminal control element.

Other objects and advantages will become apparent to those skilled in the art from the following detailed description read in conjunction with the appended claims and the drawings attached hereto.

DETAILED DESCRIPTION OF THE INVENTION

In order to ensure a clear and complete understanding of the present communication system an apparatus for establishing communication paths which is particularly useful with the communication system is discussed in some detail hereinafter.

Figure 1:
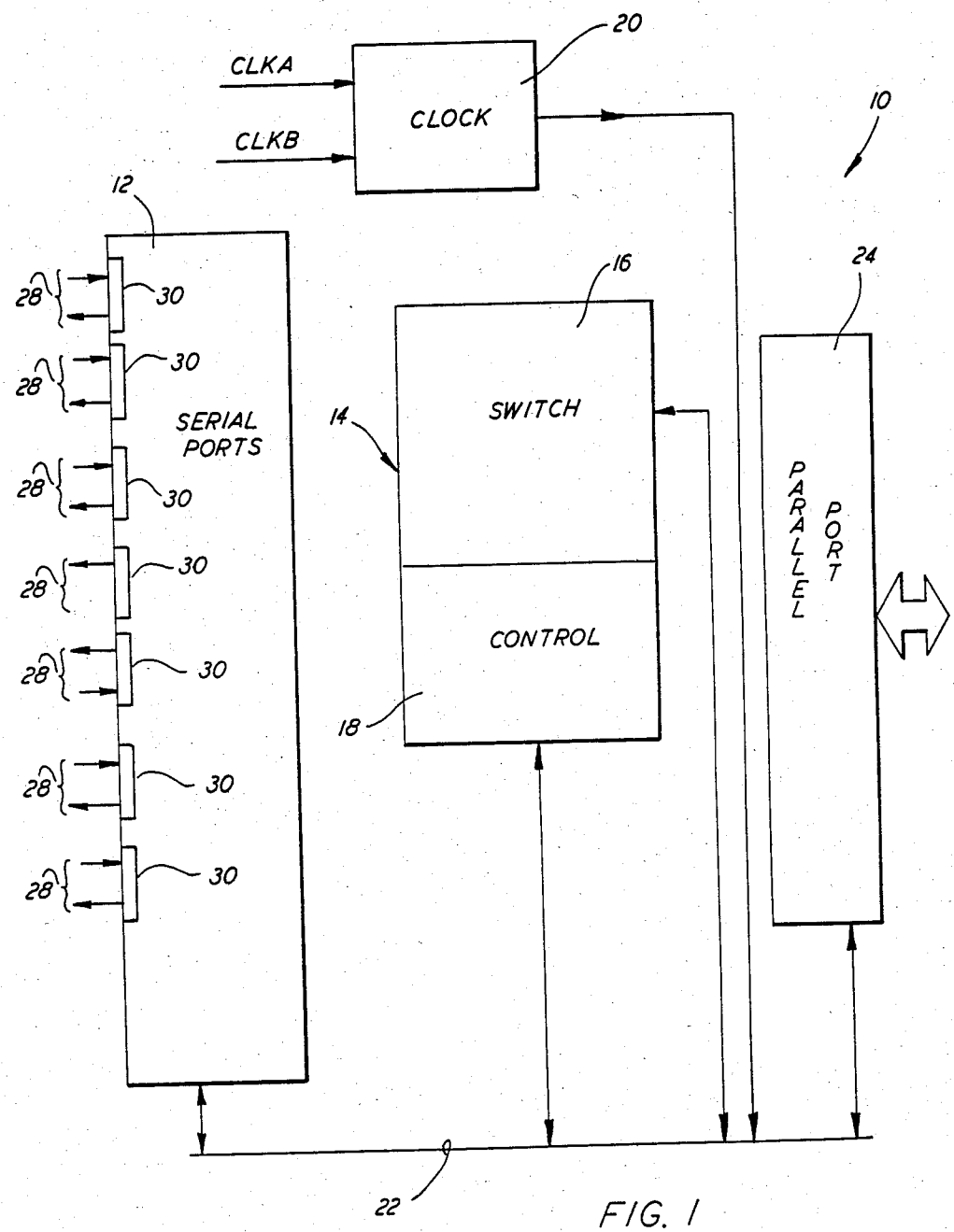
FIG. 1 is a block diagram of an apparatus useful in a communication system embodying the the principles of the present invention.

An apparatus, particularly adapted for use in the communication system of the present invention is generally indicated at 10 in FIG. 1, includes a means 12 for interfacing with a plurality of external terminals (not shown in FIG. 1), a means 14 for establishing a plurality of communication paths, the means 14 including a switch 16 and a switch controller 18, and a means 20 for regulating the transfer of information along an internal communication bus 22. The apparatus 10 further includes a means 24 for interfacing with at least one microcomputer 26.

Figure 2:
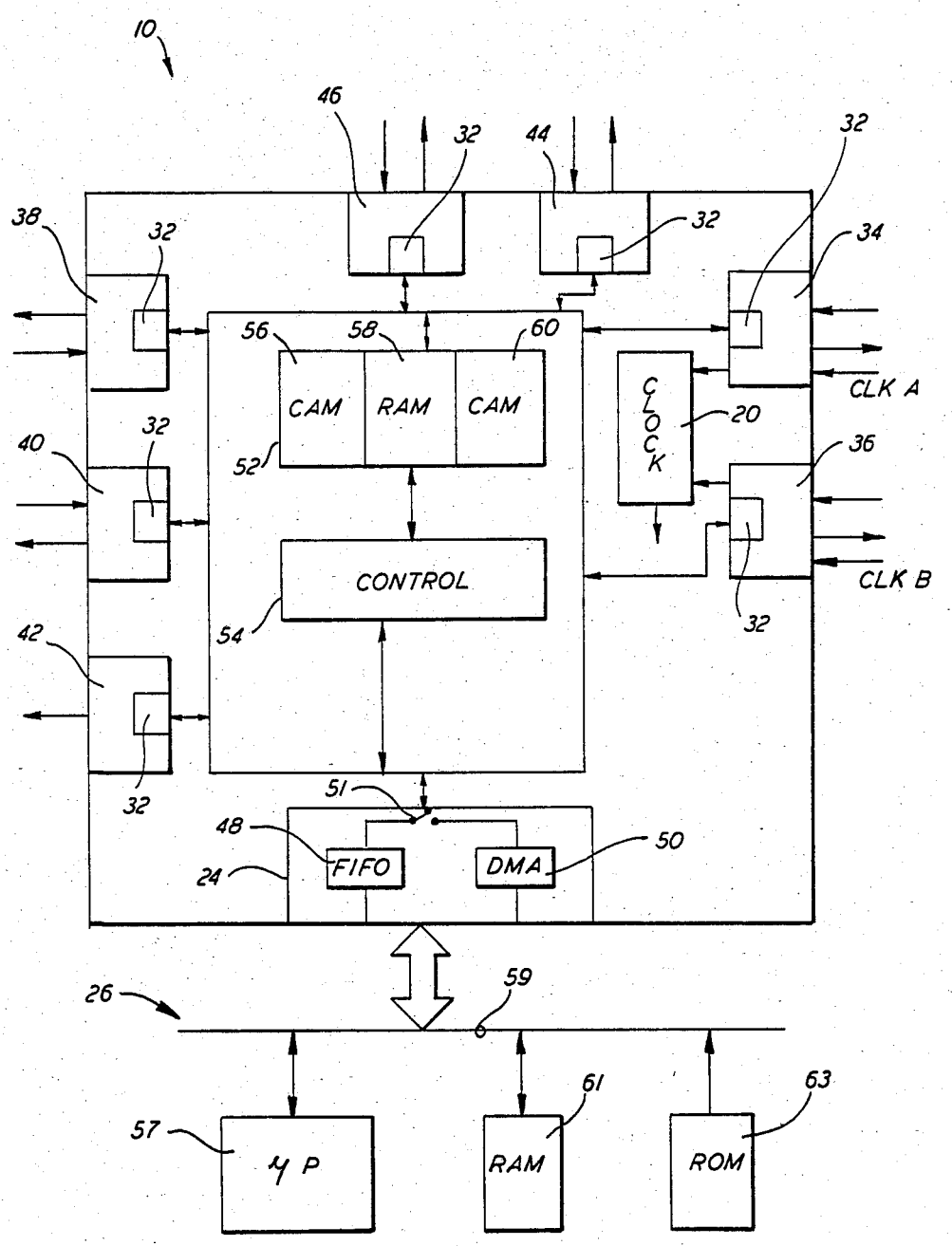
FIG. 2 is a more detailed block diagram of the apparatus shown in FIG. 1.

In one preferred embodiment, the means 12 for interfacing with a plurality of external terminals includes a number of serial ports 28 each including serial-to-parallel input converters, parallel-to-serial output converters 30 and intermediate buffers 32 to synchronize data transfer to and from the internal bus 22. In one specific embodiment, shown in FIG. 2, there are seven serial ports 28, including first and second full duplex ports, 34 and 36, respectively, compatible with CCITT standard pulse coded modulation signals and are considered asynchronous with respect to each other. The first and second full duplex ports, 34 and 36 respectively, are included to provide communication system redundancy. Further, each of the ports, 34 and 36, is provided with its own synchronizing clock input, designated as CLKA and CLKB, of which one clock is selected as an input to the information transfer regulating means 20. In addition, the first and second full duplex ports, 34 and 36 respectively, include a plurality of bidirectional communication channels, for example, there can be 32 channels per port, each channel being capable of handling a bit rate greater than 4 MHz.

The apparatus 10 further includes third and fourth full duplex ports, 38 and 40 respectively, and a fifth simplex serial port 42. The third and fourth duplex ports, 38 and 40 respectively, and the fifth simplex port 42 can interface directly with subscriber terminals, such as telephone subsets, computer terminals, or the like, and can include a variety of bit rate capabilities. The third and fourth duplex ports, 38 and 40 respectively, and the fifth simplex port 42 also have a number of independent channels. These ports, 38, 40 and 42, can be adapted to support a variety of bit rates whereby the apparatus 10 is compatible with substantially all presently available data devices as well as anticipated devices.

In addition, sixth and seventh duplex ports, 44 and 46, respectively, each having one channel per data frame are provided so that the variety of commercial devices connectable to the apparatus 10 is extended without regard to word boundaries at, for example, a 64K baud rate or a 128K baud rate. These particular ports are thus capable of transferring data thereacross in what is effectively a continuous fashion to the relatively slower peripherals interconnected thereto, i.e. at either 8 or 16 bits for each 125 microsecond frame.

The serial ports 28 interconnect with a time division multiplexed (TDM) internal bus 22 that supports the flow of data traffic throughout the apparatus 10. The TDM data bus 22 is preferably organized with time slots equal to the input clock (i.e. CLKA or CLKB) period with 512 time slots per frame. Each frame is divided into 32 channels each channel having 16 time slots. A number of the time slots per channel, for example five, are in one embodiment, dedicated to command and control signals. Each time slot can support 16 bits of information. One command and control scheme for establishing paths is described and discussed in U.S. patent application Ser. No. 682,030 entitled "SWITCH CONTROLLER" filed on even date herewith and assigned to the assignee hereof. The above-mentioned application is deemed incorporated herein by reference. In this manner, the apparatus 10 is provided with "in-channel" signalling for establishing a plurality of communication paths without a separate or dedicated control link to some external control means.

Additionally, a parallel interface port 24 is interconnected to the TDM bus 22 which interface port 24 is adapted to interface with either an 8 or 16 bit microcomputer 26.

The means for interfacing 24 with a microcomputer 26 includes, in one embodiment, a first-in-first-out memory device 48 and/or a direct memory access transfer device 50. One such interface 24 is described in detail in U.S. patent applications Ser. Nos. 682,034 and 682,035, respectively entitled "INTERFACE FOR DIRECT DATA TRANSFER" and "ADAPTIVE INTERFACE FOR A USE WITH A MICROCOMPUTER" both filed on even data herewith and assigned to the assignee hereof. Both of the immediately aforementioned patent applications are deemed fully incorporated by reference herein.

In one preferred embodiment, the interface 24 includes both the first-in-first-out or buffer, memory device 48 and the direct memory access transfer device 50 and means 51 for selecting the mode of operation. One advantage of providing these interface devices, 48 and 50, is for the convenience of subscribers. More to the point, in many instances where cost is the consideration, a less expensive microcomputer could be chosen. Usually, such a less expensive microcomputer may not be provided with the necessary bus control, interrupt and channel attention signal that are necessary for the utilization of the direct memory access transfer device 50. In such an instance, the first-in-first-out memory device 48 would become activated according to a predesignated control signal. Regardless, the microcomputer 26 includes a microprocessor portion 57 having a local bus 59, a random access memory 61 and a read only memory 63 interconnected thereto.

In the preferred embodiment, the means 14 for establishing a plurality of communication paths includes a scratch pad memory 52 and a means 54 for controlling the scratch pad memory 52.

In one embodiment the scratch pad memory 52 includes a destination content addressable memory 56 (CAM), a random access memory 58 (RAM) into which the actual data to be transferred is stored, and a source content addressable memory 60 (CAM). The means 54 for controlling such a CAM/RAM/CAM memory 52 includes a plurality of command registers responsive to command signals prefacing all information via the plurality of ports 28 or port 24. As a result, any channel of any port that provides a correct command request signal can become a command source and thereafter is capable of either entering or extracting data to, or from, the CAM/RAM/CAM scratch pad memory 52 and the various registers associated therewith. One particular implementation of the switch portion 16 of the path establishing means 14 is discussed in more detail in U.S. patent applications Ser. Nos. 682,033 and 682,030, respectively entitled "APPARATUS AND METHOD FOR PROVIDING DYNAMICALLY ASSIGNED SWITCH PATHS" and "SWITCH CONTROLLER" respectively, filed on even date herewith and assigned to the assignee hereof. The above identified patent applications are hereby deemed incorporated herein by reference.

In one specific mode of operation, upon receiving a command or a request for becoming a command source, the particular channel of the particular port providing that request becomes a command source, and upon instructions therefrom the transfer of data is carried out through the RAM portion of the CAM/RAM/CAM. The transfer being between a port having its address located in the source CAM to a port having its address located in the destination CAM. It should be noted that any channel, once becoming a command source, can set up a path, which path does not necessarily include itself. In addition, once having becomes a command source, the particular channel can break down or otherwise control the transfer of data across the switch 16. Such a mechanism is particularly useful in the event of a malfunction that is observed at a port or on a channel other than where the malfunction occurs whereupon the detecting peripheral or terminal can assume command status and reroute traffic until the malfunctioning channel or port is re-established.

The means 20 is for regulating the transfer of information along the TDM bus 22 includes a master clock for the bit by bit transfer of frames along the TDM bus 22 and synchronizes that transfer between the switch controller 18 and the switch 16.

Figure 3:
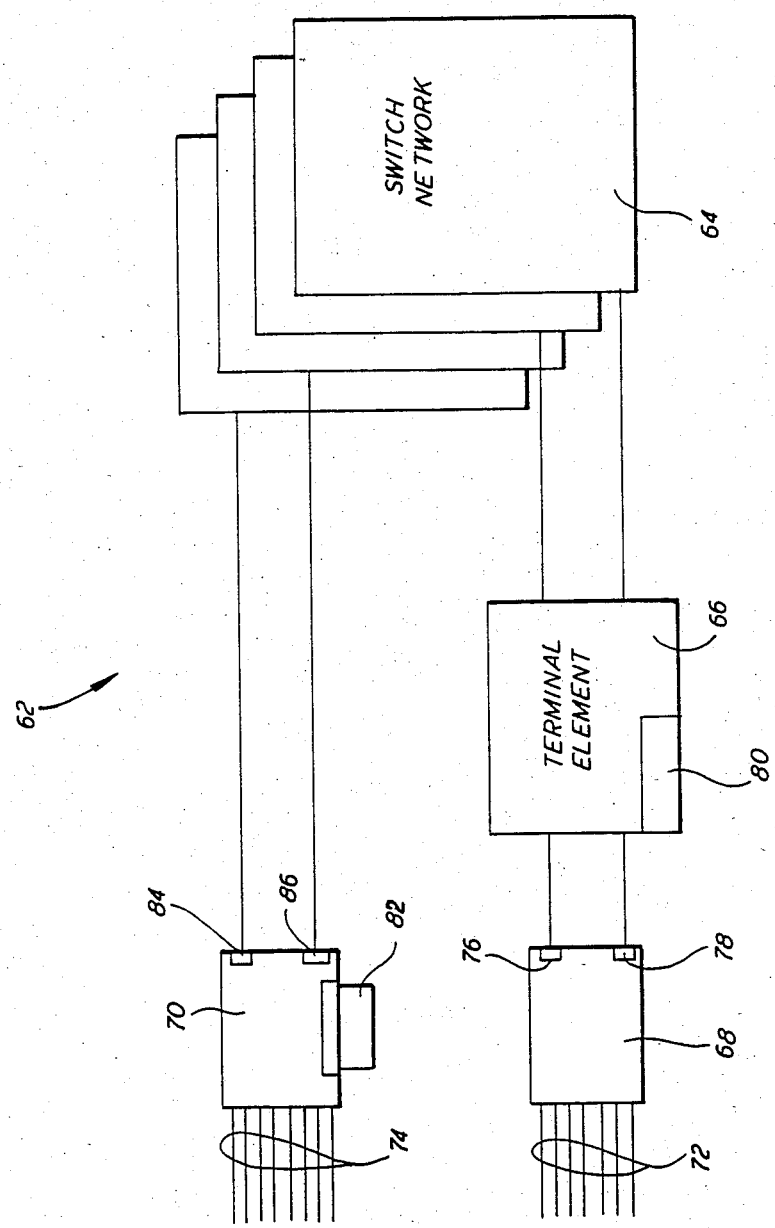
FIG. 3 is a block diagram of a communication system embodying the principles of the present invention.

A communication system, generally indicated at 62 in FIG. 3 and embodying the principles of the present invention includes a digital switching network 64, a terminal element 66, a first apparatus for establishing communication paths 68 communicating with the network via the terminal element 66 and a second apparatus for establishing communication paths 70 communicating directly with the network 64. The first apparatus 68 is adapted to interface with a group of subscribers via input lines 72. The second apparatus is adapted to interface with members of the same group of subscribers via input lines 74, the input lines 74 being dedicated to packetized data.

Preferably, the first and second ports, 76 and 78 respectively, of the first apparatus 68 interconnect to the terminal element 66 and support a plurality of pulse coded modulation communication channels. The terminal element includes a first microcomputer 80 adapted to control the establishment and removal of circuit switched paths across the digital switching network 64.

The second apparatus 70 preferably includes a second microcomputer 82 adapted to control the establishment and removal of packet paths through the network 64. In the preferred embodiment, the second microcomputer 82 is connected to the second apparatus 70 via the parallel interface port 24. The second apparatus 70 is linked to the network 64 via the first and second ports 84 and 86 respectively, thereof.

Hence, by the above-described communication system, a group of subscribers interfaced to a digital switching network are provided with a packetized data network.

Although the present invention has been described with respect to particular exemplary embodiments other configurations and arrangements will become apparent to those skilled in the art and without departing from the spirit and scope of the present invention. Consequently, the present invention is deemed limited only by the appended claims and the reasonable interpretation thereof.

What is claimed is:

1. An apparatus for establishing communications paths comprising:
   a digital switching network having at least one terminal element interconnected therewith for providing access thereto;
   means for interfacing a plurality of subscribers with said switching network, said interfacing means including a first apparatus for establishing communication paths and a second apparatus for establishing communication paths, said first apparatus being adapted to interface said plurality of subscribers to said switching network via said terminal element and said second apparatus being adapted to interface said same plurality of subscribers directly to said switching network.

2. System as claimed in claim 1 wherein said second apparatus is adapted to establish packetized data communication paths.

3. System as claimed in claim 1 wherein said first apparatus and said terminal element associated therewith establish circuit switched paths and said second apparatus establishers packet switched paths.

4. System as claimed in claim 3 wherein each said terminal element includes means for establishing said circuit switched paths through said switching network.

5. The telecommunication switching system, comprising:
   a digital switching network;
   a terminal element connected to said digital switching network;
   first processing means associated with said terminal element for establishing circuit switched paths through said switching network, and first processing means being capable of processing communications at a predetermined speed;
   first interface means for interfacing between a plurality of subscriber lines and said terminal element;
   second interface means for interfacing between said plurality of subscriber lines and said digital switching network; and
   second processing means associated with said second interface means for controlling said interface means and processing data packets at a speed substantially higher than said predetermined speed.

6. A telecommunication switching system as described in claim 5 in which the second interface means includes a parallel interface port to which the second processing means is connected.

* * * * *